Figure 5:
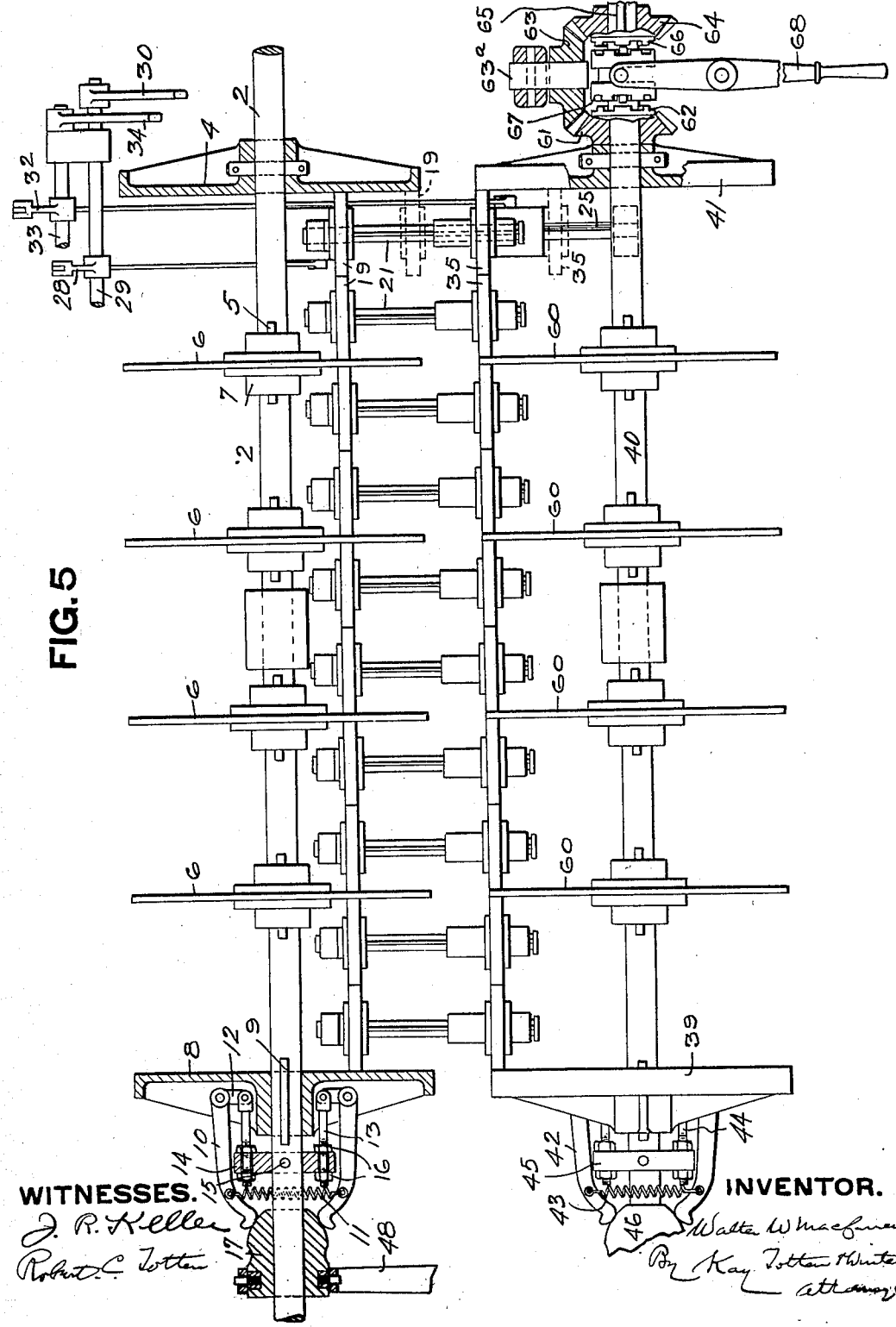

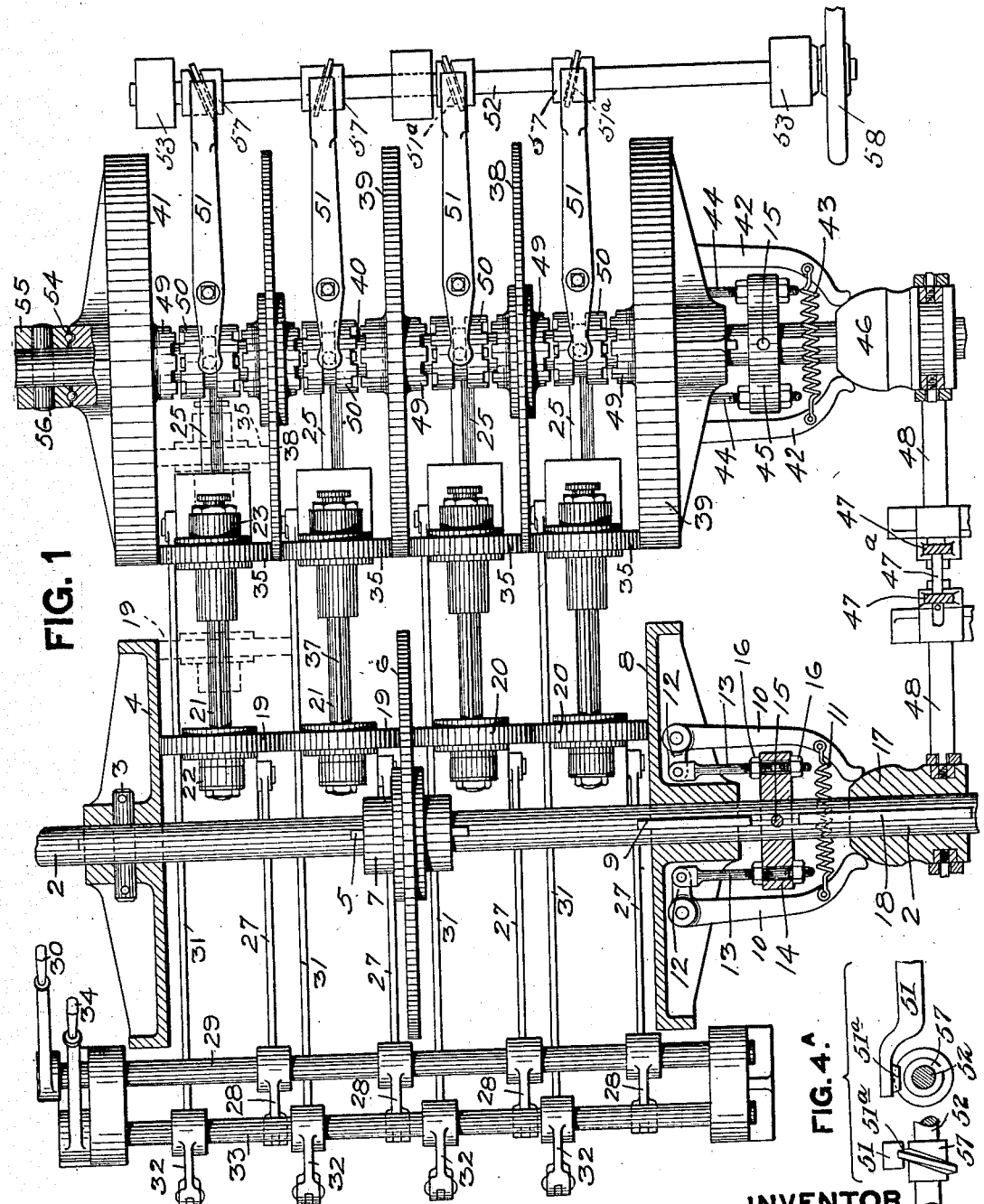

No. 860,309.  
PATENTED JULY 16, 1907.  
W. W. MACFARRE.  
TRANSMISSION GEAR.  
APPLICATION FILED JUNE 30, 1906.  
4 SHEETS—SHEET 2.
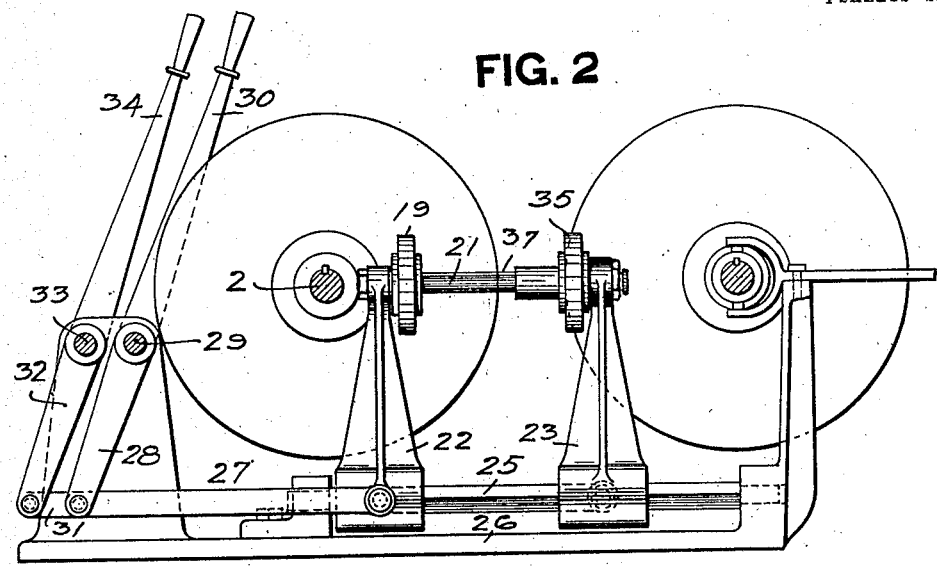
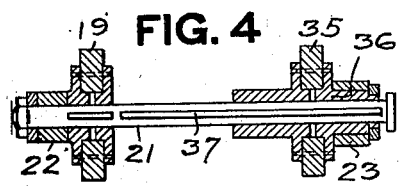
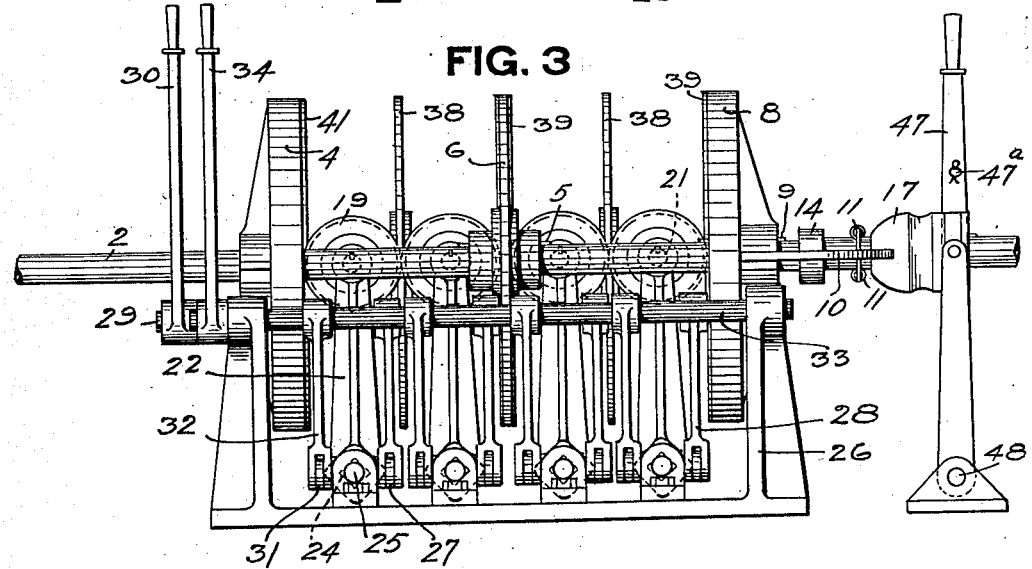
WITNESSES.  
INVENTOR.

No. 860,309. PATENTED JULY 16, 1907.
W. W. MACFARREN.
TRANSMISSION GEAR.
APPLICATION FILED JUNE 30, 1906.
4 SHEETS—SHEET 3.

WITNESSES. INVENTOR.

No. 860,309.  
PATENTED JULY 16, 1907.
W. W. MACFARREN.  
TRANSMISSION GEAR.  
APPLICATION FILED JUNE 30, 1906.
4 SHEETS—SHEET 4.
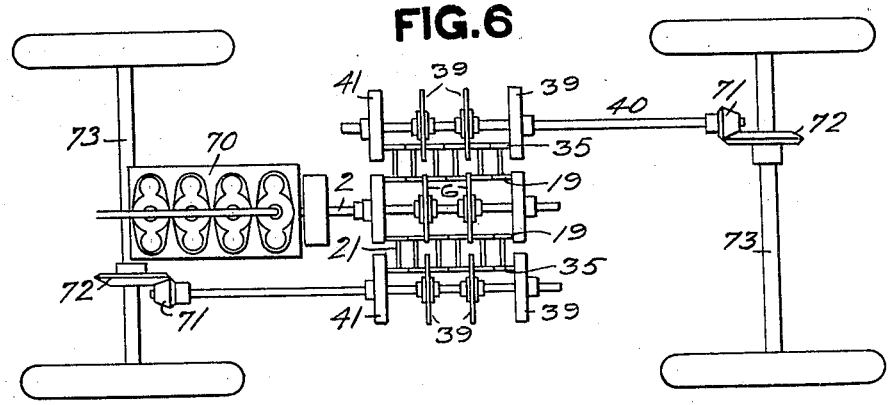
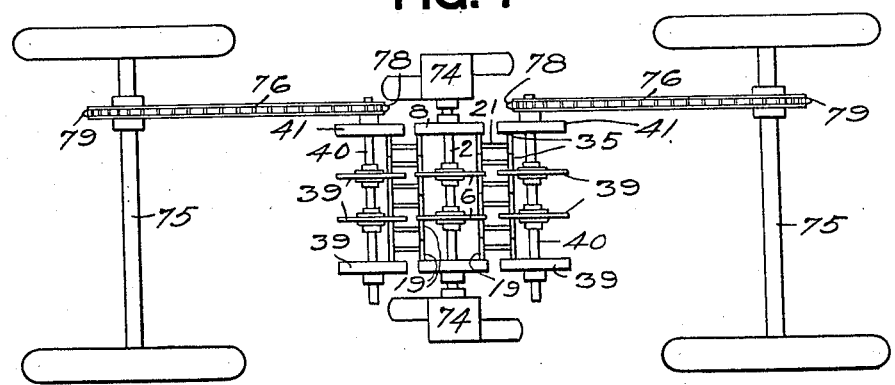
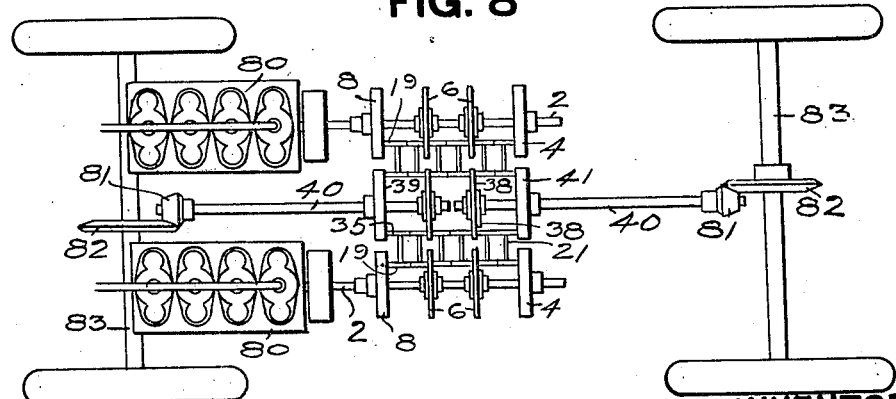
WITNESSES.  
INVENTOR.

UNITED STATES PATENT OFFICE.

WALTER W. MACFARREN, OF PITTSBURG, PENNSYLVANIA, ASSIGNOR TO WILLIAM H. DONNER, OF PITTSBURG, PENNSYLVANIA.

TRANSMISSION-GEAR.

No. 860,309.      Specification of Letters Patent.      Patented July 16, 1907.

Application filed June 30, 1906. Serial No. 324,203.

*To all whom it may concern:*

Be it known that I, WALTER W. MACFARREN, a resident of Pittsburg, in the county of Allegheny and State of Pennsylvania, have invented a new and useful Improvement in Transmission-Gear; and I do hereby declare the following to be a full, clear, and exact description thereof.

My invention relates to frictional power transmission mechanism for varying speed in which power is transmitted from a driving shaft carrying disks to a driven shaft carrying disks by means of interposed friction rollers in driving contact therewith.

In frictional gearing, the amount of power transmitted depends on the peripheral speed of the driving faces, the width of the same and the pressure between them. As the amount of power transmitted is directly proportional to the speed, it is desirable to drive with the members of largest diameter, thus obtaining the highest possible peripheral speed of the driving parts for a given rotative speed of the motor.

The prime object of my improved transmission gear is to produce a variable speed of the driven shaft with a constant speed of the driving shaft. When the speed of the driving motor can also be varied, it further increases the range of speed of the driven shaft.

Various frictional transmission mechanisms have been designed to accomplish this result, but in all of them the amount of power which can be transmitted varies with the speed of transmission; in other words, when the speed of the driven shaft is a maximum, the power is a maximum, and vice versa. When the speed of the driven shaft is a minimum, the power transmitted is also a minimum. Thus, while many of these devices will transmit power over a wide range of speed, the amount of power transmitted at the slow speed is only a fraction of that transmitted at the high speed, so that if a considerable proportion of the power is required at the lowest speed, the device has to be designed for this end, and is consequently much larger than need be, at the higher speeds.

Among the objects of my invention are to provide such a construction and arrangement of parts as will give greater efficiency and power by relieving the end thrust on the shafts; to provide for the reversing of the driven member without reversing the driving member, which may run constantly at a uniform speed in one direction; to provide separate control of the friction rollers on each set of disks, and to provide doubled drive from both sides of engine shaft for four wheel drives, as in the case of automobiles.

To these ends my invention comprises, generally stated, a driving shaft, a driven shaft parallel thereto, each of said shafts having mounted thereon a plurality of disks, a plurality of shafts at right angles to the first named shafts carrying friction rollers, and means for placing the driving and driven shafts in tension, whereby all the disks are brought into driving engagement with the rollers.

My invention further comprises the mounting of the friction rollers so that they are adjustable, and means for varying the position of the friction rollers on the driven disks, whereby the speed of the driven shaft is varied, while retaining a constant peripheral speed of the friction rollers.

My invention further comprises the driving of the alternate disks of the driven shaft in opposite directions and clutch mechanism by means of which the rotation of the driven shaft may be reversed without changing the direction of rotation of the driving shaft.

These are some of the principal features of my invention; others will be fully hereinafter set forth and claimed.

Referring to the accompanying drawing, Figure 1 is a plan view in section of my improved apparatus. Fig. 2 is a face view of two of the disks showing the mechanism for shifting the friction rollers upon said disks. Fig. 3 is an end view of the same. Fig. 4 is a detail of the friction roller shaft and bearings; Fig. 4ª are details of the reversing mechanism; Fig. 5 is modified form of my invention. Figs. 6, 7 and 8 are diagrammatic views showing the application of my invention to automobiles or like vehicles.

In the drawing, the numeral 2 designates a suitable shaft, connected to the driving shaft of a gas engine or other suitable motor. Secured to the shaft 2 by the pin 3 is the disk 4. Keyed to the shaft 2 by the key 5 is the disk 6 which is adapted to rotate with said shaft and is free to slide longitudinally thereof on the key 5 fitting in a suitable key way in the hub 7 of said disk. On the shaft 2 is another disk 8 which is keyed to said shaft by the key 9 so as to rotate with said shaft, but being free to move longitudinally thereon. Pivoted to the disk 8 are the arms 10, which are connected at their outer ends by the springs 11. Pivoted to the projecting lugs 12 on the arms 10 are the bolts 13, which engage the collar 14 secured to the shaft 2 by the pin 15. Nuts 16 engage the bolts 13 on opposite sides of the collar 14. A cone 17 is adapted to slide upon the key 18 on the shaft 2 and to rotate with said shaft. It is apparent that by advancing the cone 18 upon the shaft 2 the arms 10 will be forced apart, and owing to the fact that said arms are connected by the bolts 13 with the immovable collar 14 that as said collar 14 cannot move, that the movement of the arms 10 will act through the bolts 13 to slide the disk 8 on the shaft 2 toward the immovable disk 4.

Between the disks 4, 6 and 8, are the friction rollers 19 and 20 arranged in pairs and their peripheries moving in contact with each other and with the faces of the disks 4, 6 and 8, when driven thereby. These rollers 19 and 20 are mounted on shafts 21, and are rigidly secured to said shafts. These shafts 21 are mounted in movable housings 22 and 23 being free to rotate within said housings. These housings have at their lower ends the square openings 24 which engage the guide rods 25 secured within the frame 26. Secured to the housing 22 is the bar 27 which is secured to the arm 28 on the rock shaft 29. Mounted on said rock shaft is the lever 30 by means of which said shaft is rocked, and it is apparent that upon the rocking of said shaft the movement will be transmitted through the arm 28 to the bar 27, whereupon said bar is moved longitudinally and with it the housing 22 will be moved along the rod 25. A similar bar 31 connects the housing 23 with the arms 32 upon the rock shaft 33 which in the same manner is operated by the lever 34. The movement of the housing 22 carries with it shaft 21 and as the rollers 19 are secured to said shaft, they also move with it. The housing 23 has secured thereto the rollers 35 to which is secured the sleeve 36. The shaft 21 has a key 37 which is adapted to engage a key way in the sleeve 36 and roller 35 so that when the housing 22 is moved, the shaft 21 will slide through the sleeve 36 while the housing 23 remains stationary. In this manner it will be apparent that as indicated in dotted lines in Fig. 1, the rollers 19 may be moved to the outer edge of the disk 4 while the rollers 35 remain in the same position, so that I am enabled to effect the independent movement of rollers 19 and 35.

The rollers 35 are interposed between disks 38, 39 and 41 loosely mounted upon the shaft 40. As in the case of the shaft 2, the outer disk 41 has no longitudinal movement upon the shaft 40, while the disks 38 and 39 are adapted to slide slightly upon said shaft. The outer disk 39 has connected thereto the arms 42 connected by the springs 43 with the bolts 44, connected to the collar 45, all as described with reference to the disk 8 on the shaft 2. A cone 46 is adapted to engage the arms 42 to separate the same in order to move the disk 39 and bring all the disks on the shaft 40 into engagement with the rollers 35. In order to operate the cones 17 and 46 simultaneously, the operating levers 47 on the rock shafts 48 are connected by the pin 47ª.

The disks 38, 39 and 41 on the shaft 40 have the clutch faces 49 which are adapted to be engaged by the clutches 50 keyed to the shaft 40. Connected to each clutch is the lever 51, and in the end of each lever is the thread 51ª, the thread of every other lever being turned in the opposite direction. A shaft 52 is journaled in suitable bearings 53 and mounted on said shaft are the worms 57, which are adapted to engage the threads on the levers 51. The hand-wheel 58 on the shaft 52 provides for the rotation of the shaft 52. It will be apparent from the fact that the disks are interposed between each lever 35 that half the disks upon the shaft 40 will rotate in one direction and half in the other, every other disk rotating in the same direction. It will be obvious therefore that by turning the shaft 52 the clutches 50 may be thrown in such a way as to rotate the shaft 40 in either direction. Ball bearings 54 may be interposed between the disk 41 and the collar 55 which is pinned to the shafts 40 by the pin 56.

The shaft 2 may be driven at a constant rate of speed, and when it is desired to transmit power from said shaft to the shaft 40 the cones 17 and 46 are moved along said shafts to separate the arms 10 and 42, whereupon the disks 8 and 39 will be moved along said shafts so as to bring the rollers 19 and 35 into frictional contact with the several disks upon the shafts 2 and 40. Power will be transmitted from the disks 4, 6 and 8 to the rollers 19 and 20 and through the shafts 21 and the rollers 35. These rollers 35 being in frictional contact with the disks of the shaft 40 will rotate said disks alternately in opposite directions. As said disks are loosely mounted upon the shaft 40 no rotary movement will be imparted to said shaft 40 while the clutches remain in the positions indicated in Fig. 1. If, however, the shaft 52 is rotated to throw the clutches into engagement with the clutch faces of the disks, said clutches will be thrown into engagement with all the disks moving in the same direction, and as a consequence rotary movement will be imparted to the shaft 40 in that same direction. It is apparent that in order to reverse the shaft 40 it is only necessary to throw the clutches the opposite way so as to engage the disks rotating in the opposite direction. In this manner I provide for the reversing of the shaft 40 without reversing the shaft 2 or in any way changing its rate of speed.

It is further apparent that the speed at which the shaft 40 rotates may be varied by shifting the friction rollers 19 and 35. This is accomplished by means of the levers 30 and 34. To shift the rollers 19 to the position indicated in dotted lines in Fig. 1, it is only necessary to move the lever 30 and rock the shafts 29 whereupon the bar 27 will move so as to carry the housing 22 along the rod 25 and move the shafts 21 until the rollers 19 assume the position indicated in dotted lines Fig. 1, the shafts 21 sliding through the housing 23. With the friction rollers 19 in contact with the outer edge of the disks on the shaft 2 it is apparent that the rate of speed of the rollers 19 will be increased and consequently the rate of speed of the rollers 35 will also be increased and as a result, the rate of rotation of the shaft 40 may be further increased by shifting the rollers 38 toward the center of the disks, and this is accomplished by means of the lever 34 and through the connections from said lever to the housings 23, whereby said housings are moved along the rod 25 until the rollers 35 carried by said housings are brought to the position indicated in dotted line Fig. 1. In this manner I obtain the independent movement of the rollers 19 and 35, or, if desired by operating the levers 30 and 34 simultaneously, I obtain a simultaneous movement of the rollers 19 and 35.

By having the disk 4 secured to the shaft 2, and by moving the disks 6 and 8 toward said disk by means of the clutches in order to bring the rollers into frictional contact with the disks, and the same construction as applied to the shaft 40, I place the driving and driven shafts in tension, thereby eliminating the end thrust on all the driving parts. All the end thrust is self-contained in the rotating parts, thereby giving greater efficiency.

In Fig. 5 I have illustrated a modified form of my invention in which the same construction is employed as indicated in Fig. 1, with the exception of the reverse mechanism. In this case the friction rollers 35 are arranged in pairs, a disk 60 being arranged between each pair of friction rollers, so that all the disks are rotated in the same direction. Mounted on the shaft 40 is the loose bevel gear 61 with a clutch face 62. This bevel gear meshes with a bevel gear 63 on the stub-shaft 63ᵃ which in turn meshes with a bevel gear 64 on the driven shaft 65. This bevel gear 64 has a clutch face 66. Interposed between the clutch faces 62 and 66 is the clutch 67 which is operated by the lever 68. This clutch 67 is mounted on the shaft 40 and rotates therewith, and it is apparent that by shifting said clutch the direction of rotation of the shaft 65 may be readily changed.

In my improved form of transmission mechanism there being two sets of disks and two sets of friction rollers and means for independently adjusting either set of rollers on their disks, it is evident (when equal diameters of disks are used, as shown on the drawings) that I can effect one-half of the total speed change by shifting the friction rollers which drive the driven disks, without changing the peripheral speed of said rollers (which is governed by the position of the friction rollers on the driving disks).

It is obvious that by providing driven disks of larger diameter than the driving disks, that I can obtain most of the speed variation on the driven disks with the corresponding transmission of full power—in fact, if desired the friction rollers in contact with the driving disks may occupy a fixed position at the large diameter of the disks and the total speed variation be obtained on the driven disks, thus transmitting the maximum power over the whole range of speed.

In the operation of my transmission mechanism, particularly when applied to automobiles, it is usually preferable to shift both sets of friction rollers simultaneously, so that the speed may be instantly changed by a single motion. When climbing hills or in other situations demanding the maximum power for the given speed, the friction rollers can be separately adjusted to the best advantage.

In the construction of my transmission, the disks would be made of steel or other suitable metal and the friction rollers of paper, fiber or other soft material. In the operation of such a construction, it is desirable that the metallic member be the driven member, for the reason that slippage of the paper pulleys on the same will not injure it, but if the metallic member rotates in contact with a stationary paper pulley, it will wear flat places on the same. In the operation of my transmission, it is therefore preferable to disconnect the clutch on the driven shaft only, when the same is to be stopped, thus allowing the friction rollers to rotate constantly so that the friction rollers in contact with the driven disks are in effect drivers.

It will be noticed that in the construction of the clutches for putting the shafts in tension and thus bringing the friction rollers in driving contact with the disks, that I provide means for adjusting the pressure with which the friction faces are forced and held in contact. These means are not adjustable while running, but since all end thrust is eliminated, on my device, such operating adjustments are unnecessary and superfluous, and the clutches may be set to obtain the maximum pressure desired and so kept.

In Figs. 6, 7 and 8, I have shown my invention as applied to automobiles of the four wheel drive type. In all these constructions the power is doubled on a central shaft either being transmitted to or from the same, by providing two sets of friction rollers, both in contact with the disks on said central shaft. This arrangement saves the cost of weight of and space occupied by another set of disks and their connected shaft.

In Fig. 6 the single engine 70 is employed by which the shaft 2 is directly driven. The shaft 2 is located between two shafts 40 and these shafts 40 are driven by means of power transmitted from the shaft through two sets of friction rollers 19 and 35, all as illustrated in Fig. 1 or Fig. 2. In this way I provide for a double drive from both sides of the engine shaft for four wheel drives, and the reverse mechanism change of speed, etc., is all effected in the same manner as above described, the application to the automobile as illustrated in Fig. 6 simply being diagrammatic. The shafts 40 carry the bevel gears 71 which mesh with bevel gears 72 upon the axles 73.

In Fig. 7 I have illustrated my invention in connection with a chain drive, in which I employ two engines 74 and in which the shaft 2 is parallel with the axles 75 instead of being at right angles thereto. Likewise the shafts 40 are also parallel with the axles, and the power is transmitted from the shafts 40 by the chains 76 engaging the sprocket wheels 78 on the shafts 40 and sprocket wheel 79 on the axles 75.

In Fig. 8 I have illustrated another manner of applying my invention to four wheel drive automobiles in which two engines 80 are employed, and two driving shafts 2. In this case power is transmitted from said driving shafts to a double central shaft 40 which has bevel gears 81 meshing with bevel gears 82 upon the axles 83. It is obvious that this construction could be applied to drive the rear axle only by simply omitting the bevel gear on front axle.

In the construction indicated in Fig. 7, there is the further important advantage of being able to operate the vehicle with either or both engines.

It will be noticed further that all these constructions dispense with a differential mechanism between the wheels on the axles because the connection will slip if required.

A further important object of my invention is the transmission of large amounts of power.

In any frictional gearing in which power is transmitted from a disk to a pulley having its axis at right angles to the same, the width of face of the pulley is limited on account of the different speeds of the disk at the two edges of the pulley, producing slippage and loss of power. Consequently, the transmission of the required amount of power is effected more efficiently by a number of narrow face pulleys than by a single wide face pulley. Also, considerations of space and a limit as to rotative speeds impose a limit on the diameters of the disks used in such transmission mechanism. It is consequently of advantage to multiply the number of disks and friction pulleys as shown in my invention by which means large amounts of power can be transmitted efficiently in a small space.

What I claim is:

1. In power transmission mechanism, the combination of a driving shaft, a driven shaft parallel therewith, a plurality of disks on said shafts, a plurality of shafts at right angles to said first named shafts, friction rollers on said second named shafts adapted to engage said disks, and means for shifting one set of friction rollers independently of the other.

2. In power transmission mechanism, the combination of a driving shaft, a driven shaft parallel therewith, a disk on each of said shafts, a shaft at right angles to said driving and driven shafts, friction rollers on said shaft adapted to engage said disks, and means for shifting the friction roller across the face of the driven disk while retaining a constant peripheral speed of said friction roller.

3. In power transmission mechanism, the combination of a driving shaft, a driven shaft parallel therewith, a plurality of disks on said shafts, a plurality of shafts at right angles to said first named shafts, friction rollers on the said last named shafts adapted to engage said disks, and means for shifting one set of said friction rollers independently of or simultaneously with the other.

4. In power transmission mechanism, the combination of a driving shaft, a driven shaft parallel therewith, a plurality of disks on said shafts, a plurality of longitudinally movable shafts at right angles to said first named shafts, friction rollers on said last named shafts, one set of which are in sliding engagement therewith and adapted to engage said disks, and mechanism for moving said named shafts to shift one set of said rollers independently of the other.

5. In power transmission mechanism, the combination of a driving shaft, a driven shaft parallel therewith, a plurality of disks on said shafts, a plurality of longitudinally movable shafts at right angles to said first named shafts, friction rollers on said last named shafts adapted to engage said disks, levers and connections between said shafts and said levers, whereby one set of said rollers may be shifted independently of the other.

6. In power transmission mechanism, the combination of a driving shaft, a driven shaft parallel therewith, a plurality of disks on said shafts, a plurality of longitudinally movable shafts at right angles to said first named shafts, friction rollers on said last named shafts adapted to engage said disks, a rock shaft, connections between said rock shaft and said last named shafts to shift same, and means for locking said rock shaft.

7. In power transmission mechanism, the combination of a driving shaft, a driven shaft parallel therewith, a plurality of disks on said shafts, a plurality of shafts at right angles to said first named shafts, friction rollers on said last named shafts adapted to engage said disks, one set of said rollers in sliding engagement with said shafts, movable housings for said last named shafts, and means for moving said housings to shift the position of said rollers with reference to said disks.

8. In power transmission mechanism, the combination of a driving shaft, a driven shaft parallel therewith, a plurality of disks on said shaft, a plurality of shafts at right angles to said first named shafts, friction rollers on said last named shafts, adapted to engage said disks, one set of said rollers in sliding engagement with said shafts, movable housings for said last named shafts, guide rods on which said housings are adapted to travel, means for moving said housings to shift the position of said rollers with reference to said disks.

9. In power transmission mechanism, the combination of a driving shaft, a driven shaft parallel therewith, a plurality of disks on said shafts, a plurality of shafts at right angles to said first named shafts, friction rollers on said last named shafts adapted to engage said disks, one set of said rollers in sliding engagement with said shafts, movable housings for said last-named shafts, one set of said housings connected to said shafts and the other set connected to the set of rollers in sliding engagement with said shafts, and means for moving said housings independently of each other.

10. In power transmission mechanism, the combination of a driving shaft, a driven shaft parallel therewith, a plurality of disks on said shafts, a plurality of shafts at right angles to said first named shafts, friction rollers on said last named shafts, adapted to engage said disks, one set of said rollers in sliding engagement with said shafts, movable housings for said last named shafts, one set of said housings connected to said shafts, the other set connected to the set of rollers in sliding engagement with said shafts, two levers and connections between said housings and said levers to move said housings independently of each other.

11. In power transmission mechanism, the combination of a driving shaft, a driven shaft parallel therewith, a plurality of disks on said shafts, a plurality of shafts at right angles to said first named shafts, friction rollers on said last named shafts adapted to engage said disks, and means operative at any or no speed for putting the driving and driven shafts in tension, whereby all the disks are brought into driving engagement with the rollers.

12. In power transmission mechanism, the combination of a shaft, a plurality of disks on said shafts, one of said disks being immovable with said shaft, the remaining disks longitudinally movable with said shaft, a plurality of friction rollers adapted to engage said disks, and means operative at any or no speed for moving said movable disks, whereby said shaft is put in tension and all the disks brought into driving engagement with the rollers.

13. In power transmission mechanism, the combination of a shaft, a plurality of disks on said shaft, one of said disks being immovable with said shaft, the remaining disks being longitudinally movable thereon, a plurality of friction rollers adapted to engage said disks, and clutch mechanism for moving the outer one of said movable disks, whereby the shaft is put in tension and all the disks brought into driving engagement with said rollers.

14. In power transmission mechanism, the combination of a shaft, a plurality of disks on said shaft, one of said disks being immovable on said shaft, the remaining disks being longitudinally movable thereon, friction rollers adapted to engage said disks, expandable arms pivoted on one of said movable disks, a collar on said shaft, connections between said collar and said arms, and means for expanding said arms.

15. In power transmission mechanism, the combination of a shaft, a plurality of disks on said shaft, one of said disks immovably fixed thereon, the remaining disks being longitudinally movable thereon, friction rollers adapted to engage said disks, expansible arms pivoted to one of said movable disks, a collar rigidly secured to said shaft, bolts connecting said arms with said collar and a cone adapted to expand said arms.

16. In power transmission mechanism, the combination of a driving shaft, a driven shaft parallel therewith, a plurality of disks on said shafts, one disk on each shaft immovably fixed thereon, the remaining disks being longitudinally movable thereon, a plurality of shafts at right angles to said first named shafts, friction rollers on said last named shafts adapted to engage said disks, and means for moving simultaneously the outermost movable disk on each of said shafts, whereby said driving and driven shafts are put in tension and all the disks brought into engagement with said friction rollers.

17. In power transmission mechanism, the combination of a driving shaft, a driven shaft parallel therewith, a plurality of disks on said shafts, a plurality of shafts at right angles to said first named shafts, friction rollers on said last named shafts adapted to engage said disks, and means for reversing the direction of rotation of said driven shaft without changing the direction of rotation of said driving shaft.

18. In power transmission mechanism, the combination of a driving shaft, a driven shaft parallel therewith, a plurality of disks on said shafts, a plurality of shafts at right angles to said first named shafts, friction rollers on said last named shafts adapted to engage said disks, two of said friction rollers being interposed between each disk on said driving shaft, and one of said first named friction rollers between each disk on said driven shaft, whereby the alternate disks on said driven shaft rotate in opposite directions, and means for throwing said driven shaft into positive engagement with either set of said oppositely driven disks on said driven shaft.

19. In power transmission mechanism, the combination of a driving shaft, a driven shaft parallel therewith, a plurality of disks on said shafts, a plurality of shafts at right angles to said first named shafts, friction rollers on said last named shafts adapted to engage said disks, the disks on said driving shaft all rotating in the same direction, the disks on said driven shaft rotating alternately in opposite directions, and clutch mechanism for bringing said driven shaft into engagement with either set of said oppositely driven disks.

20. In power transmission mechanism, the combination of a driving shaft, a driven shaft parallel therewith, a plurality of disks on said shafts, a plurality of shafts at right angles to said first named shafts, friction rollers on said last named shafts adapted to engage said disks, the disks on the driving shaft all rotating in the same direction, the disks on the driven shaft rotating alternately in opposite directions, said disks having clutch faces thereon, clutches interposed between said disks, and mechanism for throwing said clutches simultaneously to engage either set of said oppositely rotating disks.

21. In power transmission mechanism, the combination of a shaft, a disk on said shaft, a plurality of friction rollers in driving engagement with said disk on the same face thereof, and a plurality of parallel shafts, a disk on each of said shafts, friction rollers in driving engagement with said disks, and means for connecting the friction rollers first mentioned with the friction rollers last mentioned to transmit power between the first shaft and the last shafts.

22. In power transmission mechanism, the combination of a shaft, disks thereon, a pair of parallel shafts one on each side of said first mentioned shaft, disks thereon, friction rollers in driving engagement with all the disks, and means for connecting the friction rollers in engagement with the central shaft disks with those on the outside shaft disks to transmit power between the central and the outside shafts.

23. In power transmission mechanism, the combination of a central driving shaft, a disk on said shaft, driven shafts parallel therewith, a disk on each of said driven shafts and friction rollers in driving engagement with all the disks, the whole arranged to transmit power at a variable speed between said driving and driven shafts.

24. In power transmission mechanism, the combination of a central driving shaft, driven shafts parallel therewith, a plurality of disks on said shafts, and friction rollers adapted to engage said disks, the whole arranged to transmit power at a variable speed between said driving and driven shafts.

25. In power transmission mechanism, the combination of a central driving shaft, driven shafts parallel therewith, at each side thereof, a plurality of disks on said shafts, friction rollers adapted to engage said disks, and connections between said driven shafts and said axles of an automobile or like vehicle.

26. In a friction transmission gear for automobiles, axles, a central driving shaft at right angles to the axles, disks on said shaft, a parallel shaft, connected to an axle, disks on said shaft, a second parallel shaft, connected to the other axle and a series of friction rollers adapted to receive power from the driving shaft and transmit the same to the driven shafts at a variable speed.

In testimony whereof, I the said WILLIAM W. MACFARREN have hereunto set my hand.

WALTER W. MACFARREN.

Witnesses:
ROBERT C. TOTTEN,
J. R. KELLER.